United States Patent [19]

Steiger et al.

[11] 4,286,651
[45] Sep. 1, 1981

[54] GEOTHERMAL HEATING SYSTEM AND METHOD OF INSTALLING THE SAME

[75] Inventors: Douglass W. Steiger; Edward J. Kees, both of Red Lake Falls, Minn.

[73] Assignee: Environmental Impact Research Group, Red Lake Falls, Minn.

[21] Appl. No.: 144,257

[22] Filed: Apr. 28, 1980

[51] Int. Cl.³ .................................................. F24J 3/02
[52] U.S. Cl. ................................ 165/45; 137/236 R; 175/22
[58] Field of Search .............. 165/45; 62/260; 60/641; 175/19, 22; 137/236

[56] References Cited

U.S. PATENT DOCUMENTS

| 709,887 | 9/1902 | Dossey | 165/45 |
|---|---|---|---|
| 1,981,730 | 11/1934 | Hawkins | 165/45 |
| 3,274,769 | 6/1966 | Reynolds | 165/45 |
| 3,827,243 | 8/1974 | Paull et al. | 60/641 |
| 4,094,151 | 6/1978 | Fujita et al. | 165/45 |

FOREIGN PATENT DOCUMENTS

| 453210 | 11/1927 | Fed. Rep. of Germany | 175/22 |
|---|---|---|---|
| 2016139 | 9/1979 | United Kingdom | 165/45 |

Primary Examiner—Sheldon J. Richter
Attorney, Agent, or Firm—Williamson, Bains, Moore & Hansen

[57] ABSTRACT

A geothermal system and method of installing the same comprises the steps successively driving a drive pipe structure vertically into the ground at a plurality of locations so that a major portion of the length of the drive pipe structure is located below the frost line. An elongate geothermal pipe having closed ends is inserted into the drive pipe structure and its lower end is interlocked with a drive point device located at the lower end of the drive pipe structure. Thereafter, when the drive pipe is removed, the geothermal pipe remains anchored to the drive point. The geothermal pipes are connected together by conduits and connected to a heat pump so that a heat exchange liquid will be circulated through the system.

3 Claims, 5 Drawing Figures

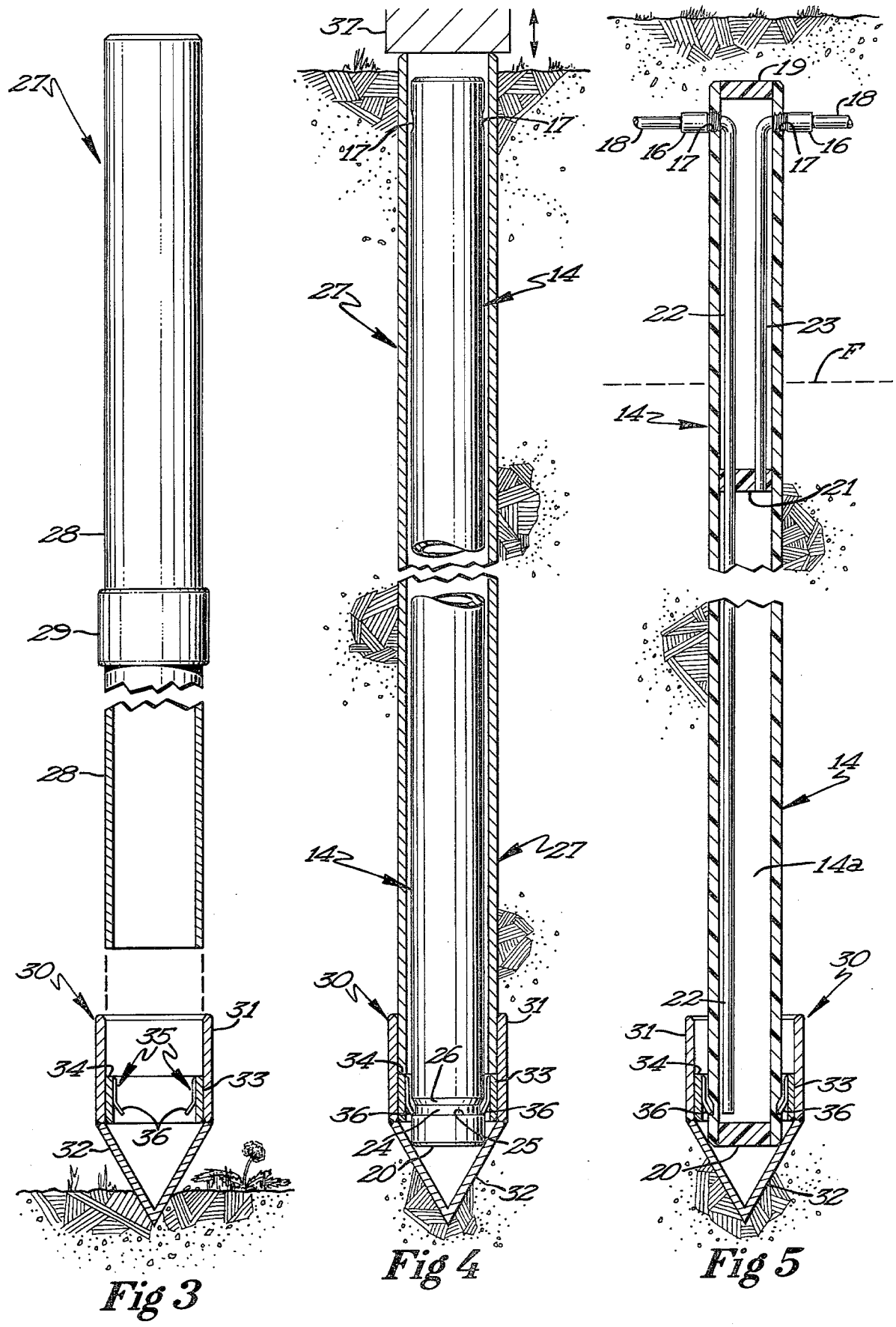

GEOTHERMAL HEATING SYSTEM AND METHOD OF INSTALLING THE SAME

SUMMARY OF THE INVENTION

This invention relates to a geothermal system for extracting and utilizing heat energy.

Geothermal systems are now being used as a means for extracting heat from the ground for heating domestic and industrial structures. Typically, the geothermal system comprises a plurality of pipes arranged horizontally in grid configuration through which a heat exchange liquid is circulated by the heat pump. The heat pump extracts the heat from the liquid and it may be used to heat the interior of a building. It is therefore necessary to undertake extensive excavation in installing the horizontally arranged pipes in the conventional geothermal system. This installation process is not only costly but the extensive excavation impairs the appearance of an existing lawn or grounds when the system is installed for heating a domestic structure.

It is a general object of this invention to provide a novel geothermal system and process of installing the same in which a drive pipe structure is vertically driven into the ground at successive locations and in which a geothermal pipe is inserted into the drive pipe at each location, the geothermal pipe being anchored by a drive point when the drive pipe is removed.

It is another object of this invention to provide a geothermal system and process of installing the same wherein the geothermal pipes are vertically disposed and are interconnected together and to a heat pump, the installation of the system substantially eliminating the need for excavation and requiring only a fraction of the time needed for installing the conventional geothermal system.

These and other objects and advantages of this invention will more fully appear from the following description made in connection with the accompanying drawings, wherein like reference characters refer to the same or similar parts throughout the several views.

FIGURES OF THE DRAWINGS

FIG. 3 is a side view of the drive pipe structure foreshortened and with parts broken away for clarity;

FIG. 4 is a cross-sectional view of the drive pipe structure completely driven into the ground and foreshortened with the geothermal pipe inserted therein; and FIG. 5 is a cross-sectional view of an installed geothermal pipe illustrated in the anchored relation with the drive point.

DESCRIPTION OF THE PREFERRED EMBODIMENT OF THE INVENTION

Figure 1:
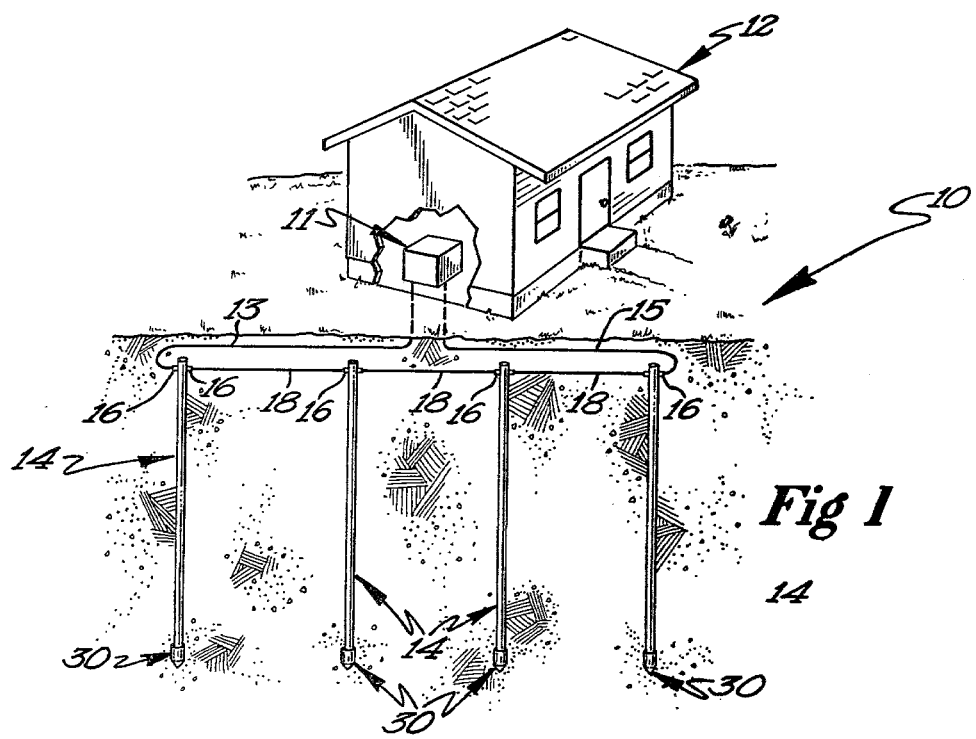
FIG. 1 is a diagrammatic perspective view of the geothermal system.
Figure 2:
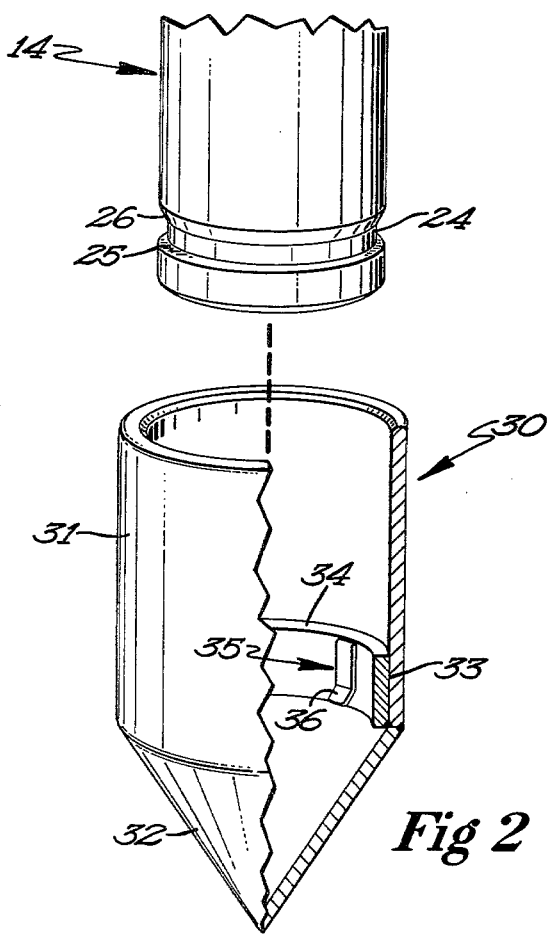
FIG. 2 is fragmentary, exploded view of the lower end portion of a geothermal pipe and a drive point device with certain parts thereof broken away for clarity.

Referring now to the drawings and more particularly to FIG. 1, it will be seen that one embodiment of the novel geothermal system, designated generally by the reference numeral 10, is thereshown. The geothermal system 10 includes a heat pump 11 which is of conventional construction and which extracts heat from a heat exchange liquid in a well known manner. The heat pump 11 is positioned within a house 12 or other suitable building structure to be heated, and is connected to one of a plurality of vertically disposed geothermal pipes 14 by a supply conduit 13. It will be noted that the geothermal pipes 14 are vertically disposed in the ground and one of the geothermal pipes is connected by a return conduit 15 to the heat pump 11. The geothermal system will contain a heat exchange liquid which will be circulated through the system by the heat pump 11.

Referring now to FIGS. 1 and 5, it will be seen that the geothermal pipes 14 are vertically positioned within the ground in spaced apart side-by-side relation and each is formed of a nonmetallic material, preferably plastic, which is chemically inert. Each geothermal pipe is also formed of sections which are coupled together in end to end relation and each pipe has a closed upper end 19 and a closed lower end 20.

Adjacent geothermal pipes are interconnected together by interconnecting conduits 18 as best seen in FIG. 1. In this regard, the end portions of the interconnecting conduits 18, the supply conduit 13 and the return conduit 15 are provided with fittings 16 at opposite ends thereof, the fittings threadedly engaging threaded openings in the upper end portion of each geothermal pipe. It will also be seen that each geothermal pipe 14 is provided with an intermediate wall element 21 which is affixed to the interior thereof intermediate the upper and lower ends thereof.

Each geothermal pipe 14 is provided with an elongate inlet pipe 22 therein which has its lower end positioned adjacent the closed lower end of the associated geothermal pipe. The inlet pipe projects through the intermediate wall 21 and has its upper end secured in communicating relation to a fitting 16 so that the inlet pipe 22 is connected to an interconnecting conduit 18 or to a supply conduit 13. Each geothermal pipe 14 is also provided with a small outlet pipe 23 positioned interiorly thereof, the lower end of which projects through the intermediate wall element 21 and the upper end being connected to the fitting 16. The outlet pipe for each geothermal pipe 14 is connected in communicating relation to either one of the interconnecting conduits 18 or to the return conduit 15.

The lower section of each geothermal pipe is provided with an annular groove 24 therein which defines an upwardly facing shoulder 25. The groove 24 is also defined by a downwardly extending frustro-conical camming surface 26. In operation, the heat exchange liquid will be introduced into the system and will flow through the inlet pipe 22 into each geothermal pipe at the lower end thereof, and will then flow outwardly through the outlet pipe 23 into the next adjacent geothermal pipe. It is pointed out that the dwell time of the heat exchange liquid in the heat exchange chamber 14a of each geothermal pipe will be sufficient to permit an effective heat exchange action between the liquid and surrounding soil to take place. In the northern portions of north temperate zones, the ground temperature of the soil below the frost line is approximately 50° F. and in some instances 45° F. Thus, the temperature of the heat exchange liquid flowing into the heat pump 11 through the return conduit 15 is approximately 50° F. and the heat exchange action in the heat pump may be used as a source of heat. Alternatively, the heat differential may also be used as a cooling medium in an air conditioning system. It is pointed out that the geothermal pipes will be positioned in the ground vertically so that only the upper end portions thereof are above the frost line.

The unique method of installing the geothermal system permits the geothermal pipes and interconnecting conduits to be placed in the ground while minimizing the amount of excavation required. In this regard, the means for installing the geothermal system includes a drive pipe structure 27 comprised of a plurality of drive pipe sections 28 interconnected together in end to end relation by suitable couplings 29. The drive pipe sections 28 are formed of steel and the drive pipe structure 27 is provided with a drive point device 30 at its lower end.

The drive point device 30 includes an upper cylindrical portion 31 having a lower conical portion 32 integral therewith and extending downwardly therefrom. The cylindrical portion 30 of the drive point device has a larger diameter than the external diameter of the drive pipe sections 28 thereby permitting the lower end of the lowermost drive pipe section to be inserted into the upper cylindrical portion 31. The drive point device also includes an annular member 33 rigidly affixed to the interior cylindrical surface of the upper cylindrical portion adjacent the lower end thereof. The annular member 33 presents an upwardly facing annular shoulder 34 which is engaged by the lower edge of the lowermost drive pipe section 28. The drive point device 30 is also provided with a plurality of clips 35 which are rigidly affixed to the inner surface of the annular member 33 and each clip including an inwardly and downwardly projecting end portion 36 as best seen in FIG. 3.

During installation of the geothermal system, a drive pipe structure 27 including a drive point device 30 will be driven into the ground by sonic impacting device 37 so that the lower end of the drive pipe structure is located several feet below the ground surface. It is preferred that forty or fifty feet of drive pipe structure be used in most locations. After the drive pipe has been driven into the ground, a corresponding length of geothermal pipe will be inserted into the drive pipe structure until the lower end of the lowermost geothermal pipe section engages interiorly of the drive point device 30. It will be seen that the clips 33 will engage the external surface of the lower end portion of the lower geothermal pipe section and will be cammed into the groove 24 and engage the radial shoulder 25.

Thereafter, the drive pipe sections will be pulled from embedded relation in the ground and from engaging relation with the drive point device 30. Since the drive point device 30 will remain embedded in the ground, it will anchor the lower end of the geothermal pipe and the latter will also remain in the ground. This permits installation of the geothermal pipe without excavation. This operation will be repeated at the desired number of locations and a small trench will be dug for the interconnecting conduit and for the supply and return conduits. Thus, it will be seen that the entire system may be installed quickly with a minimum of excavation. The heat exchange liquid will then be introduced in the system and will circulate through the heat exchange chamber 14a which, as seen, is located between intermediate wall element 21 and the closed lower end. The heat exchange action occurs in the chamber 14a. It is pointed out that chamber 14a is located below the frost line and it is only when the heat exchange liquid is passing through the supply, intermediate or return conduits that the liquid passes through the cooler zone. It will also be noted that since the geothermal pipes are vertically disposed, a relatively large number of such pipes can be installed in a relatively small area.

From the foregoing description it will be seen that I have provided a novel geothermal pipe system which may be readily and economically installed through my novel method of installation.

It will further be seen that my novel geothermal pipe system is not only of simple and inexpensive construction but functions in a highly efficient manner.

It is anticipated that various changes can be made in the size, shape and construction of the geothermal pipe system disclosed herein without departing from the spirit and scope of the invention as defined by the following claims.

What is claimed is:

1. A geothermal system including a heat pump through which heat exchange liquid is circulated,
   a plurality of elongate pipes vertically embedded in the ground so that the major portion of each pipe is located below the frost line, each pipe being closed at its upper and lower ends,
   a plurality of anchoring devices, each being secured to the lower end of one of said pipes, each anchoring device including an upper cylindrical portion and a lower conical portion, the upper cylindrical portion of each anchoring device having a diameter larger than the diameter of the associated pipe receiving the latter therein,
   means on the lower end portion of each pipe and on said anchoring device interlocking each pipe with the associated anchoring device,
   a plurality of interconnecting conduits, each connecting each pipe with an adjacent pipe,
   a supply conduit connecting one of said pipes with said heat pump, a return conduit connecting one of said pipes with said heat pump whereby heat exchange liquid will be circulating through the pipes in the heat pump,
   each of said geothermal pipes having an intermediate wall element affixed to the interior thereof to thereby define a geothermal chamber within each geothermal pipe between said intermediate wall element and the closed lower end of the geothermal pipe, each geothermal pipe having an elongate inlet pipe positioned therein having one end thereof connected in communicating relation with a supply conduit and having its other end positioned adjacent the closed lower end of the associated geothermal pipe, and each geothermal pipe having an outlet conduit therein having one end thereof communicating with the upper end of said geothermal chamber and having the other end thereof connected with an interconnecting conduit.

2. The geothermal system as defined in claim 1 wherein said interlocking means on each anchoring device comprises a plurality of clips affixed to the interior thereof and projecting inwardly thereof and, wherein said interlocking means on the lower end of each pipe comprises an annular groove engaged by said clips.

3. A geothermal system as defined in claim 1 wherein said geothermal chamber for each geothermal pipe is located below the frost line.

* * * * *